US007946170B2

(12) United States Patent
Nakamura

(10) Patent No.: US 7,946,170 B2
(45) Date of Patent: *May 24, 2011

(54) RESIDUAL LIQUID QUANTITY DETECTING METHOD

(76) Inventor: Yasuaki Nakamura, Sunto-gun (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/697,124

(22) Filed: Jan. 29, 2010

(65) Prior Publication Data

US 2010/0126265 A1 May 27, 2010

Related U.S. Application Data

(63) Continuation of application No. 11/577,594, filed as application No. PCT/JP2005/020160 on Oct. 27, 2005, now Pat. No. 7,658,103.

(30) Foreign Application Priority Data

Nov. 1, 2004 (JP) .................................. 2004-317613

(51) Int. Cl.
*G01F 23/00* (2006.01)
(52) U.S. Cl. ..................................................... 73/290 R
(58) Field of Classification Search ................. 73/53.01, 73/149, 290 R, 714, 865, 290 B, 302
See application file for complete search history.

(56) References Cited

U.S. PATENT DOCUMENTS

| | | | |
|---|---|---|---|
| 4,770,033 A * | 9/1988 | Nicolai | ............................ 73/149 |
| 5,309,760 A | 5/1994 | Watanabe et al. | |
| 5,859,365 A | 1/1999 | Kataoka et al. | |
| 7,174,780 B2 | 2/2007 | Akahane et al. | |
| 7,658,103 B2 * | 2/2010 | Nakamura | .................. 73/290 R |

FOREIGN PATENT DOCUMENTS

| | | |
|---|---|---|
| CA | 1335000 C | 3/1995 |
| EP | 0350074 B1 | 10/1995 |
| JP | 2-19719 A | 1/1990 |
| JP | 9-280920 A | 10/1997 |

OTHER PUBLICATIONS

International Search Authority, International Search Report for PCT/JP2005/020160, Dec. 6, 2005.

* cited by examiner

*Primary Examiner* — John Fitzgerald
(74) *Attorney, Agent, or Firm* — Trojan Law Offices

(57) ABSTRACT

A residual liquid quantity detecting method capable of accurately detecting the residual quantity of liquid without relying upon visual observation, preventing overfill at the time of refilling. A residual liquid quantity detecting method for a liquid supply container (100) has a container body (108) having a liquid supply opening (126) and has a liquid storage chamber (118) in which liquid (119) is sealed, the liquid storage chamber (118) being formed in the container body (108) and communicating with the liquid supply opening (126). The liquid (119) is supplied from the liquid supply opening (126) to the outside of the container by primary supply pressure generated through reduction, by pressure, in volume of the liquid storage chamber (118). The residual quantity of the liquid (119) in the liquid storage chamber (118) is detected by detecting primary supply pressure of the liquid (119).

9 Claims, 6 Drawing Sheets

RESIDUAL LIQUID QUANTITY DETECTING METHOD

PRIORITY CLAIM

This is a continuation of and claims the benefit of priority from U.S. patent application Ser. No. 11/577,594, filed Apr. 19, 2007, now U.S. Pat. No. 7,658,103, which claims the benefit of priority from PCT/JP2005/020160 filed Oct. 27, 2005, the full disclosures of which are incorporated herein by reference.

TECHNICAL FIELD OF THE INVENTION

The present invention relates to, for example, a residual liquid quantity detecting method that detects the fuel of a fuel cartridge, namely the residual quantity of liquid, used in fuel supply devices which supply fuel to fuel cells.

PRIOR ART

Conventionally, for example, devices equipped with fuel cells acting as a power supply for electronic devices such as a personal computer are known (refer to Kokai 2002-49440 (FIG. 1, FIG. 2)). The fuel cells disclosed in this patent gazette are direct methanol fuel cells (DMFC). These fuel cells directly supply methanol to the fuel electrodes of fuel cells. The personal computer is a notebook type personal computer (hereinafter referred to as simply a notebook PC). This notebook PC is prepared such that a fuel cartridge, that supplies fuel to a fuel cell, is mounted to the outside end of the tip of the cover member that covers the notebook PC main body, namely the outside end of side opposite the hinge link member, and supplies fuel to the panel of the fuel cell arranged inside the cover member.

The residual quantity of internal fuel can be visually confirmed by means of forming the fuel cartridge as disclosed in the patent gazette using a transparent resin. When incorporated inside the notebook PC main body, the residual quantity of fuel can be confirmed by means of providing a confirmation window in the notebook PC main body.

There are also methods of usage when you might want to electrically detect the residual quantity of fuel without visual confirmation and then use software to manage the residual quantity of fuel. For example, successively displaying the residual quantity of fuel on the liquid crystal display screen of the notebook PC and if the residual quantity is low, display a warning.

In addition, when replenishing fuel to a fuel cartridge removed from a device such as a notebook PC, the re-filled quantity cannot be accurately understood by a visual confirmation of the residual quantity of fuel. Because of this, a specified quantity of fuel must be filled after discarding all the fuel inside a container once in order to prevent over fill.

The object of the present invention is to take these points into consideration and provide a residual liquid quantity detecting method that can accurately detect the residual quantity of liquid without visual confirmation and prevent over fill when re-filling.

DISCLOSURE OF THE INVENTION

The residual liquid quantity detecting method of the present invention comprises a container body that has a liquid supply opening and a liquid storage chamber formed inside the container body, is linked to the liquid supply opening, and seals the liquid. The residual liquid quantity detecting method of the liquid supply container in which liquid is supplied from the liquid supply opening to the outside of the container by means of a primary supply pressure generated by reducing the capacity of the liquid storage chamber under pressurization is characterized by detecting the primary supply pressure of the liquid and then detecting the residual quantity of liquid inside the liquid storage chamber.

In an embodiment of the present invention, the detected residual quantity of liquid can be corrected based on the ambient temperature of the liquid storage chamber.

The residual quantity of liquid V can be measured by the following equation.

$$V = \frac{P - P_b}{P_0 - P_1} \times (V_0 - V_1) \qquad \text{EQUATION}$$

In this equation V is the residual quantity of liquid, P is the primary pressure while being monitored, $P_b$ is a fixed number, $V_0$ is an arbitrary residual quantity of liquid, $P_0$ is the primary pressure of the residual quantity of liquid $V_0$, $V_1$ is a residual quantity of liquid smaller than $V_0$, and $P_1$ is the primary pressure of the residual quantity of liquid $V_1$.

Furthermore, it is preferable to correct the detected residual quantity of liquid V by the following equation.

$$V' = \frac{(T \times P - T_0 \times P_b) \times (V_0 - V_1)}{T_0 \times (P_0 - P_1)} \qquad \text{EQUATION}$$

In this equation V' is the corrected residual quantity of liquid, $T_0$ is the ambient temperature when measuring $P_0$, $V_0$, $P_1$, $V_1$, $P_b$, and T is the ambient temperature when detecting P.

A partition member that moves inside the liquid storage chamber to reduce the capacity is arranged inside the liquid storage chamber. The partition member can be activated by means of a compression gas that is sealed between the liquid storage chamber and the container body.

The residual liquid quantity detecting method comprises the container body that has a liquid supply opening and a liquid storage chamber formed inside the container body, is linked to the liquid supply opening, and seals the liquid. In addition, the residual liquid quantity detecting method of the liquid supply device which is comprised by a liquid supply container wherein liquid is supplied from the liquid supply opening to the outside of the container by means of a primary supply pressure generated by reducing the capacity of the liquid storage chamber under pressurization and a regulator that is connected to the liquid supply container and reduces the pressure of the liquid, supplied by the primary supply pressure, to a secondary supply pressure along with supplying the liquid of the reduced secondary supply pressure to the outside is characterized by detecting the secondary supply pressure and then detecting the residual quantity of liquid inside the liquid storage chamber.

A detecting unit that supplies the liquid of the primary supply pressure to the outside is provided on the regulator and can detect the primary supply pressure of the liquid supplied from the detecting unit and then detect the residual quantity of liquid instead of detecting the secondary supply pressure.

In addition, the detected residual quantity of liquid can be corrected based on the ambient temperature of the liquid supply device.

Because the residual liquid quantity detecting method of the liquid supply container in which liquid is supplied from the liquid supply opening to the outside of the container by means of a primary supply pressure generated by reducing the capacity of the liquid storage chamber under pressurization detects the primary supply pressure and then detects the residual quantity of liquid inside the liquid storage chamber, the residual liquid quantity detecting method of the present invention can successively confirm the residual quantity of liquid accurately by means of monitoring the primary supply pressure. Consequently, when re-filling liquid, a correct quantity can be replenished thereby making it possible to prevent over fill.

When correcting the detected residual quantity of liquid based on the ambient temperature of the liquid supply device, the residual quantity of liquid can be detected with even higher accuracy.

When measuring the residual quantity of liquid V using the following equation, the residual quantity of liquid can be accurately detected.

$$V = \frac{P - P_b}{P_0 - P_1} \times (V_0 - V_1)$$ EQUATION

Furthermore, when correcting the detected residual quantity of liquid V using the following equation, the residual quantity of liquid can be detected with even higher accuracy.

$$V' = \frac{(T \times P - T_0 \times P_b) \times (V_0 - V_1)}{T_0 \times (P_0 - P_1)}$$ EQUATION Because the residual liquid quantity detecting method of the liquid supply device is comprised by the container body that has the liquid supply opening and the liquid storage chamber formed inside the container body, is linked to the liquid supply opening, and seals the liquid as well as comprises the liquid supply container wherein liquid is supplied from the liquid supply opening to the outside of the container by means of the primary supply pressure generated by reducing the capacity of the liquid storage chamber under pressurization and the regulator that is connected to the liquid supply container and reduces the pressure of the liquid, supplied by the primary supply pressure, to a secondary supply pressure along with supplying the liquid of the reduced secondary supply pressure to the outside, the residual liquid quantity detecting method of the present invention detects the secondary supply pressure and then detects the residual quantity of liquid inside the liquid storage chamber. Therefore, the residual quantity of liquid can be accurately detected when the liquid supply device is incorporated.

When the detecting unit that supplies the liquid of the primary supply pressure to the outside is provided on the regulator and can detect the primary supply pressure of the liquid supplied from the detecting unit and then detect the residual quantity of liquid instead of detecting the secondary supply pressure, the residual quantity of liquid can be detected from the liquid of the primary supply pressure as well as from the liquid of the secondary supply pressure.

Furthermore, when correcting the detected residual quantity of liquid, based on the ambient temperature of the liquid supply device, the residual quantity of liquid can be detected with even higher accuracy.

PREFERRED EMBODIMENT OF THE INVENTION

Figure 1:
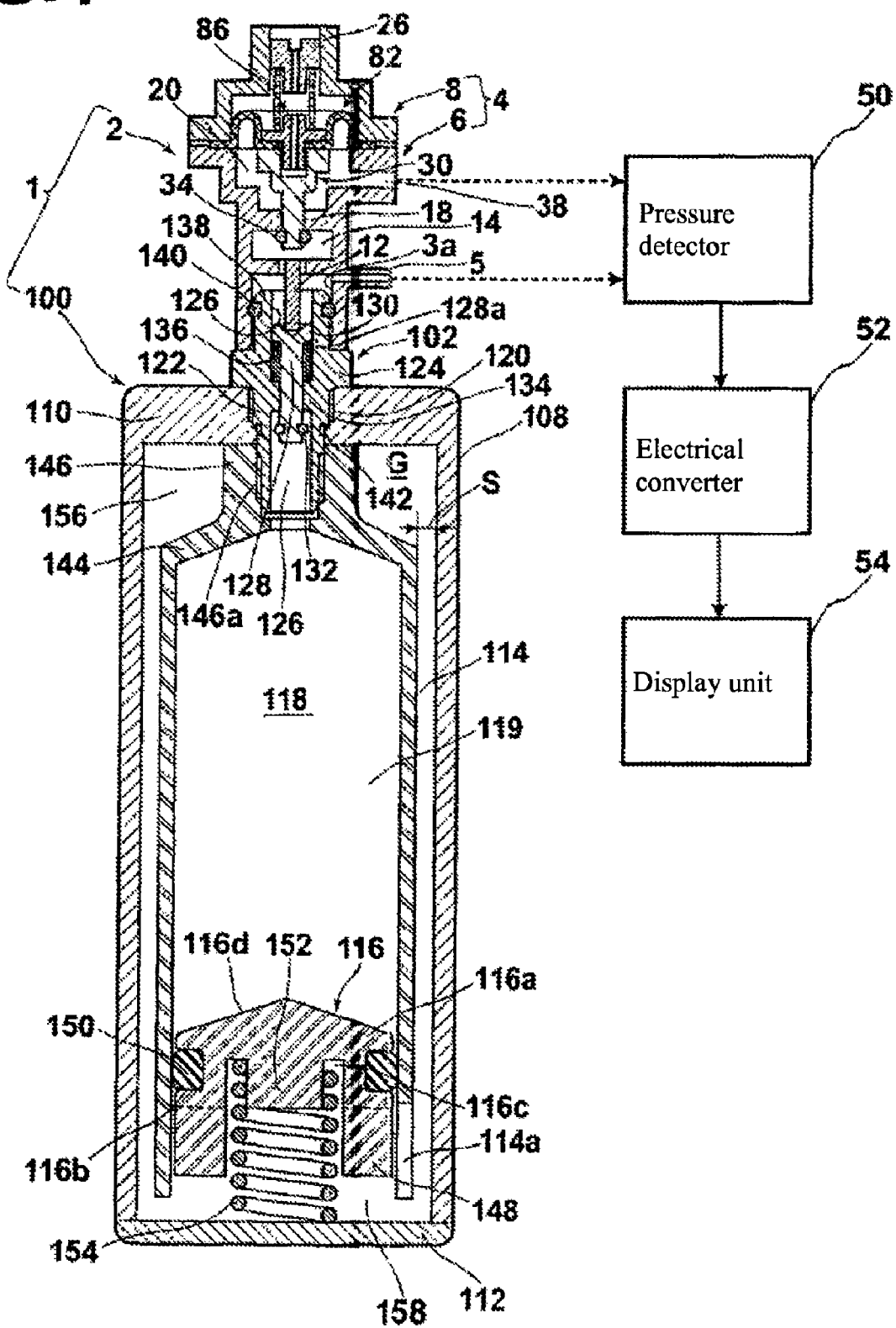
FIG. 1 is a longitudinal section of the liquid supply device that uses the residual liquid quantity detecting method of the present invention.

FIG. 1 is a longitudinal section of the fuel supply device (liquid supply device) that uses the residual liquid quantity detecting method of the present invention. The fuel supply device (hereinafter simply referred to as supply device) 1 is comprised by the regulator 2 and the fuel cartridge (liquid supply container) (hereinafter simply referred to as cartridge) 100 whereon the regulator 2 is mounted. The fuel (liquid) for the fuel cell 119 is filled inside the cartridge 100.

At first, the cartridge 100 will be described. The entire cartridge 100 is a cylindrical shape and has a hollow cylindrical-shaped outer container (container body) 108 and a lower cover 112 that tightly seals the opened lower end of this outer container 108. Here, up and down are upward and downward directions in FIG. 1 for ease of description. A cylindrical-shaped inner container 114 is arranged inside the outer container 108 and a partition member 116 is arranged at the lower portion inside the inner container 114. A fuel storage chamber (liquid storage chamber) 118 is formed that stores alcohol fuel 119 such as methyl alcohol or ethyl alcohol for example. The dimensions between the inner container 114 and the outer container 108 are determined so as to form a cylindrical space S between the outer peripheral surface of the inner container 114 and the inner peripheral surface of the outer container 108.

The material of the outer container 108 is preferably a polycarbonate resin but can also be AS resin or ABS resin. Furthermore, the material of the inner container 114 is preferably a polycarbonate resin resistant to methanol fuel. When the outer container 108 and the inner container 114 are transparent, the position of the partition member 116 that moves inside the inner container 114 in response to the fuel consumption of the fuel 119 can be understood and the residual quantity of the fuel 119 inside the fuel storage chamber 118 can be found visually. In the residual liquid quantity detecting method of the present invention however, it is not always necessary for the materials to be transparent. As an example, the lower cover 112 of the outer container 108 is formed from a polycarbonate resin and is secured to the outer container 108 by means of ultrasonic welding. Although the upper wall 110 of the cartridge 100 is integrally formed with the outer container 108, it can be formed on another member and attached to the outer container 108 by means of ultrasonic welding in the same manner as the lower cover 112.

A connection member 102 (a compositional part of the cartridge 100) is attached to the center of the upper wall 110. The entire connection member 102 is formed in a cylindrical shape and has a flange member 124 tightly sealed to the outer surface of an attachment member 122 (whereon is formed external threads) and the upper wall 110. The connection member 102 is attached by the attachment member 122 being screwed into a screw hole 120 of the attachment member 122. The connection member 102 has a through hole (liquid supply opening) 126 with a circular cross section passing through from the upper portion to the lower portion along the lengthwise direction of the connection member 102. A scaled shaft 128, that has a large diameter member 130 at the apex, is arranged so as to be slidable inside the through hole 126. A depression 128a is formed on the upper surface of the large diameter member 130.

The large diameter member 130 of the upper end of the sealed shaft 128 connects to the inner surface of the through hole 126 and a valve element, namely an O-ring 132, is fitted in the peripheral groove of the lower end. A diameter reduction member 134 is formed at the center of the through hole 126. A compression coil spring 136 is compressed between the large diameter member 130 of the sealed shaft 128 and the diameter reduction member 134. Normally, this spring applies a spring pressure upward onto the sealed shaft 128. Because of this, the O-ring 132 is in a state pressing against the lower surface of the diameter reduction member 134 sealing the inside of the fuel storage chamber 118. In FIG. 1 the sealed shaft 128 is pressed downward and altered by means of a column-shaped protrusion 12 of the regulator 2 (described later). In addition, a peripheral groove 138 is formed close to the upper end of the connection member 102 and an O-ring 140 fitted inside this peripheral groove 138. An O-ring 142 is also fitted in a peripheral groove close to the lower end of the attachment member 122 serving to provide a seal between the upper wall 110.

The lower end of the inner container 114 is open and an approximate circular column-shaped convex member 146 is formed at the center corresponding to the connection member 102 on a closed top wall 144. A through hole 146a is formed on the convex member 146 in the upward and downward directions. The inner surface of the top wall 144 is a shape almost complementary with the upper surface 116d of the partition member 116. This shape makes it possible to discharge the fuel 119 without waste.

The partition member 116 has a rib 148 integrally formed with a disc-shaped or circular column-shaped upper member 116a (with the outside diameter arranged inside the inner container 114) and the upper member 116a on the lower end of this upper member 116a. The rib 148 is formed in a radial shape at multiple locations. A peripheral groove 116b is formed on the outer periphery of the upper member 116a and an O-ring 150 is fitted in this peripheral groove 116b. This O-ring 150 makes sliding contact with the inner surface of the inner container 114 and maintains the inside of the fuel storage chamber 118 in a sealed state. An annular groove 116c is formed on the lower portion of the center of the upper member 116a and the inside of the annular groove 116c forms a boss 152. A compression coil spring 154 is placed between the annular groove 116c and the lower cover 112.

Figure 6:
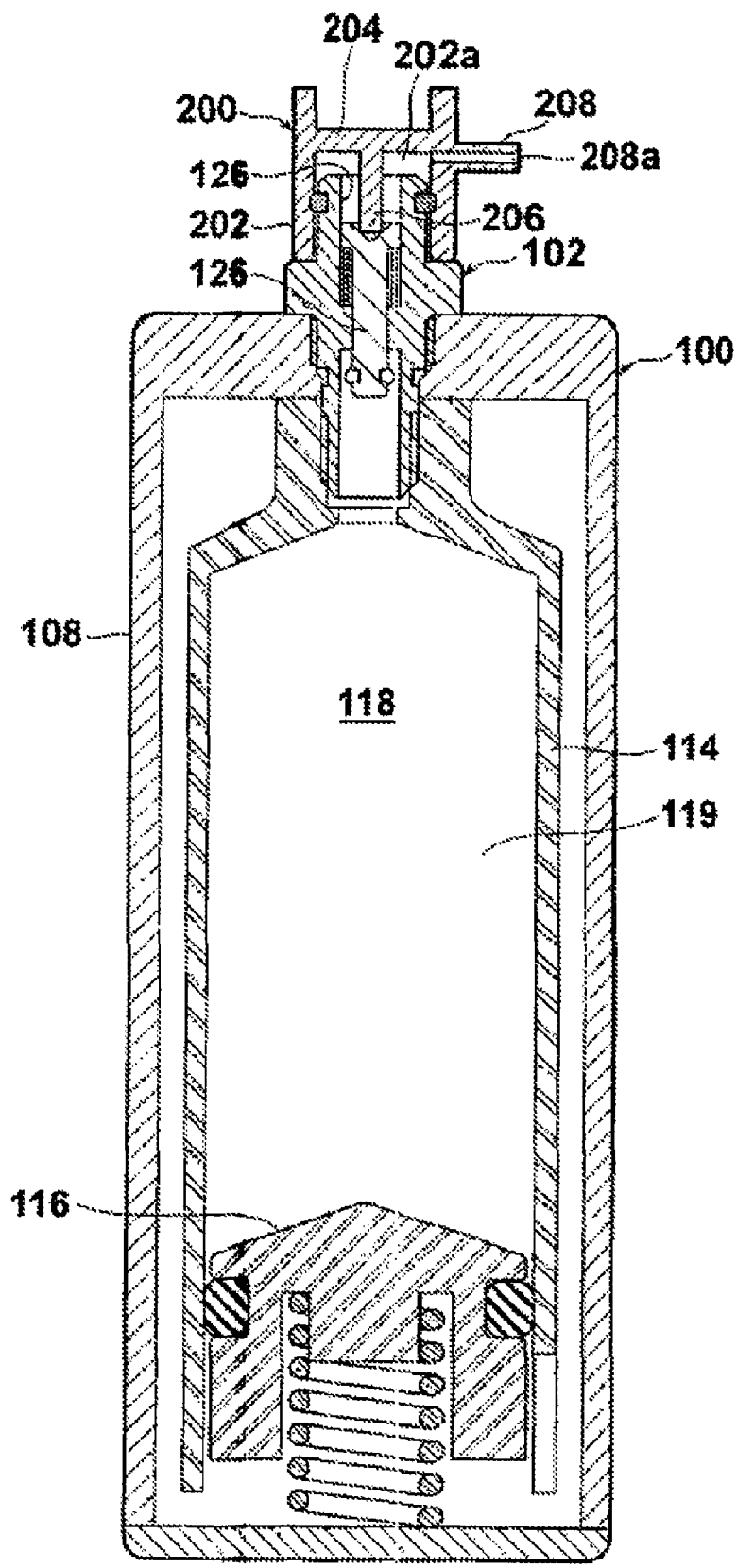
FIG. 6 is a cross section of the fuel cartridge showing when an adapter is mounted.

A notch 114a is formed along the lengthwise direction of the inner container 114 on the lower portion of the inner container 114. This notch 114a is open at the lower end of the inner container 114 and has a length extending downward from directly beneath the O-ring 150 when the partition member 116 is located at the lower end as shown in FIG. 6. A space 156 between the inner container 114 and the outer container 108 links a lower space 158 of the partition member 116 through the notch 114a. Pressurization gas G is enclosed in the space 156 and the pressure of this pressurization gas G presses the partition member 116 inside the inner container 114 upward. Therefore, the fuel 119 inside the fuel storage chamber 118 is always in a pressurized state and if the seal of the connection member 102 is released, the composition is such that the fuel 119 will be immediately discharged from the connection member 102 to the outside. An inert gas is used for the pressurization gas G.

Figure 2:
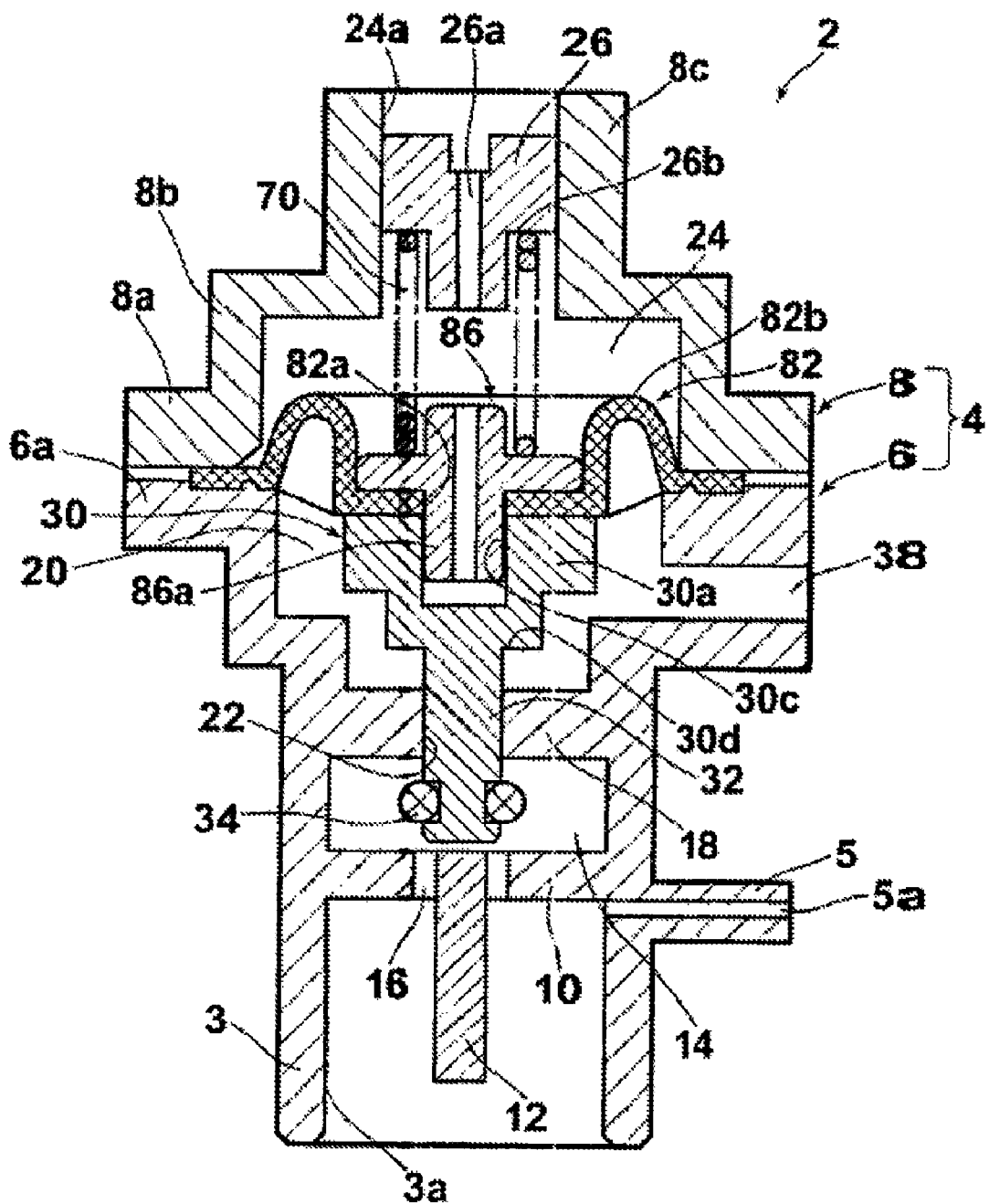
FIG. 2 is an expanded cross section showing an expanded view of the regulator of FIG. 1.

Next, the regulator 2 will be described referring to FIG. 2. FIG. 2 is an expanded cross section showing only an expanded view of the regulator of FIG. 1 before being mounted to the liquid supply container 100. The regulator 2 has a case 4 comprised by a main body 6 and a cover 8. The main body 6 and the cover 8 have flanges 6a, 8a with shapes similar to a circle or a rectangular, respectively. These flanges 6a, 8a are arranged opposite to each other and a diaphragm 82 (described later) held between the flanges 6a, 8a is mutually secured by screws (not shown in the figure) to form one unit. A circular convex member 8b is protruded on the cover 8 and then a screw adjustment member 8c is protruded on this circular convex member 8b.

A cylindrical introduction convex member 3 is formed on the main body 6 facing downward. Here, up and down are upward and downward directions in FIG. 1 and FIG. 2 for ease of description. An introduction opening 3a, where the connection member 102 of the cartridge 100 is mounted, is formed on the introduction convex member 3. A partition 10 is formed inside the introduction opening 3a of the introduction convex member 3. A column-shaped protrusion 12 is formed on the partition 10 facing downward. This column-shaped protrusion 12 functions to press on the sealed shaft 129. A plurality of transparent holes 16 are drilled open close to the column-shaped protrusion 12. These transparent holes 16 pass through to a central chamber 14 adjacent to a partition 12. A pressure adjustment chamber 20 is formed in the main body through a partition 18 at the upper portion of the central chamber 14. A hole 22 is drilled open at the center of the partition 18. In addition, a detection nozzle (detector) 5 is formed on the introduction convex member 3 facing towards the side. This detection nozzle 5 has a detection hole 5a that passes through to the introduction opening 3a.

The cover 8 has a concave member, namely an air chamber 24, which contains the diaphragm 82 and a supporter 86. This air chamber 24 links the hole 24a of the screw adjustment member 8c whereon a female screw hole is formed. A pressure adjustment screw 26 is screwed into and secured in this hole 24a. A transparent hole 26a, that passes through the air chamber 24 and the external environment at atmospheric pressure, and an annular shoulder 26b, facing downward, are formed on this pressure adjustment screw 26.

The approximate circular-shaped diaphragm 82 is attached between the main body 6 and the cover 8 in a state in which the diaphragm 82 is pressed by means of the flanges 6a, 8a from both surfaces. The diaphragm 82 has an opening 82a at the center along with an annular rising protrusion 82b concentric to the opening 82a as well as on the side of the air chamber 24. In the diaphragm 82 a sealing member 30 is installed in the pressure adjustment chamber 20 and the supporter 86 is attached to the opposite side, namely the air chamber 24 side.

The sealing member 30 has at its center a flange 30a (mounting surface to the diaphragm 82), a boss 30b (protruding from the flange 30a), and a sealed shaft 32 (passes through from this boss 30b to the hole 22 of the partition 18). A screw hole 30c is formed in the sealing member 30. This screw hole 30c is positioned at the opening 82a of the diaphragm 82. An O-ring 34 covers the tip of the sealed shaft 32. This O-ring 34 is arranged within the peripheral groove formed on the sealed shaft 32. The sealed shaft 32 and the O-ring 34 are structured to form a control valve that reduces the primary pressure (primary supply pressure) to the secondary pressure (secondary supply pressure).

The shape of the supporter 86 material is an approximate circular shape or a cone shape and a male threaded member 86a, that is screwed into the screw hole 30c of the sealing member 30, is formed at the center. According to this composition, the diaphragm 82 is in a state held by means of the sealing member 30 and the supporter 86. In other words, the sealing member 30 is attached to the diaphragm 82 by means of holding the diaphragm 82 engaged with the supporter 86.

A compression coil spring 70 is compressed between the annular shoulder 26b of the pressure adjustment screw 26 and the supporter 86 and a suitable pressure is applied to the diaphragm 82. This pressure is adjusted by means of the pressure adjustment screw 26. In other words, the pressure is adjusted while the regulator is being used so as to make the difference between the secondary pressure inside the pressure adjustment chamber 20 and the atmospheric pressure almost uniform. A discharge opening 38 is formed facing towards the side in the pressure adjustment chamber 20. This discharge opening 38 discharges the fuel at the secondary pressure.

When the regulator 2, that was formed in this manner, is attached to the cartridge 100, the O-ring 140 seals tightly to the inner surface of the introduction opening 3a as shown in FIG. 1 and the column-shaped protrusion 12 presses downward on the apex 128a of the sealed shaft 128. This makes it possible to separate the O-ring 132 from the diameter reduction member 134, release the seal, and then emit the fuel 119. Thereafter, the fuel of the primary pressure flows from the transparent hole 16 into the inside of the central chamber 14. Because the fuel flows from the detection hole 5a to the outside at the same time, the primary pressure can be detected by means of a pressure detector 50 connected to the detection nozzle 5.

The fuel 119 that flows into the inside of the central chamber 14 flows from the central chamber 14 to the pressure adjustment chamber 20 through the gap of the hole 22 and the sealed shaft 32. If the pressure inside the pressure adjustment chamber 20 becomes high, the diaphragm 82 will rise from the position shown in FIG. 2 to the position shown in FIG. 1. This pressure adjustment chamber 20 is set by means of the pressure adjustment screw 26 such that it reaches a predetermined desired secondary pressure with respect to the atmospheric pressure of the air chamber 24 adjacent to the diaphragm 82. Consequently, if the pressure adjustment chamber 20 reaches the secondary pressure, the O-ring 34 will make contact with the partition 18, the hole 22 will close, and an amount equal to or more than the fuel 119 that flows into the pressure adjustment chamber 20 will be prevented from flowing.

When the fuel 119 is discharged from the discharge opening 38 and supplied for use while using the fuel supply device 1, the pressure of the pressure adjustment chamber 20 will fall below the desired secondary pressure. This results in the diaphragm 82 being pressed out towards the pressure adjustment chamber 20 by the compression coil spring 70. As a result, the O-ring separates from the partition 18 and the fuel 119 inside the central chamber 14 flows into the pressure adjustment chamber 20 through the gap between the hole 22 of the partition 18 and the sealed shaft 32. Thereafter, when the pressure of the pressure adjustment chamber 20 rises to the desired secondary pressure, the diaphragm 82 resets to the upward direction and the O-ring 34 is pressed against the partition 18 once again and then the central chamber 14 and the pressure adjustment chamber 20 are closed on each other. This operation is repeated in response to the consumption of the fuel 119 while the supply of fuel 119 continues and the inside of the pressure adjustment chamber 20 is maintained at an almost uniform secondary pressure.

Along with the fuel 119 being consumed and the quantity reduced as time passes, the member partition 116 is gradually squeezed by the pressure of the pressurization gas G inside the inner container 114. Then, the fuel 119 is discharged from the connection member 102 until the member partition 116 approaches the closed top wall 144.

Next, a general concept extending from the detection of the residual fuel quantity of the cartridge 100 of the fuel supply device 1 comprised in this manner will be described referring to FIG. 1 once again. For the fuel 119 at the secondary pressure and the primary pressure discharged from either the discharge opening 38 or the detection nozzle 5, the secondary pressure or the primary pressure are measured by the pressure detector 50. Next, for this measured pressure the residual fuel quantity is computed by an electrical converter 52 along with being calculated and then the residual fuel quantity converted to an electrical value. This residual fuel quantity is then displayed in a display unit 54, such as a liquid crystal, for example. The pressure detector 50, electrical converter 52, and display unit 54 are built into the notebook PC (not shown in the figure) itself.

Figure 3:
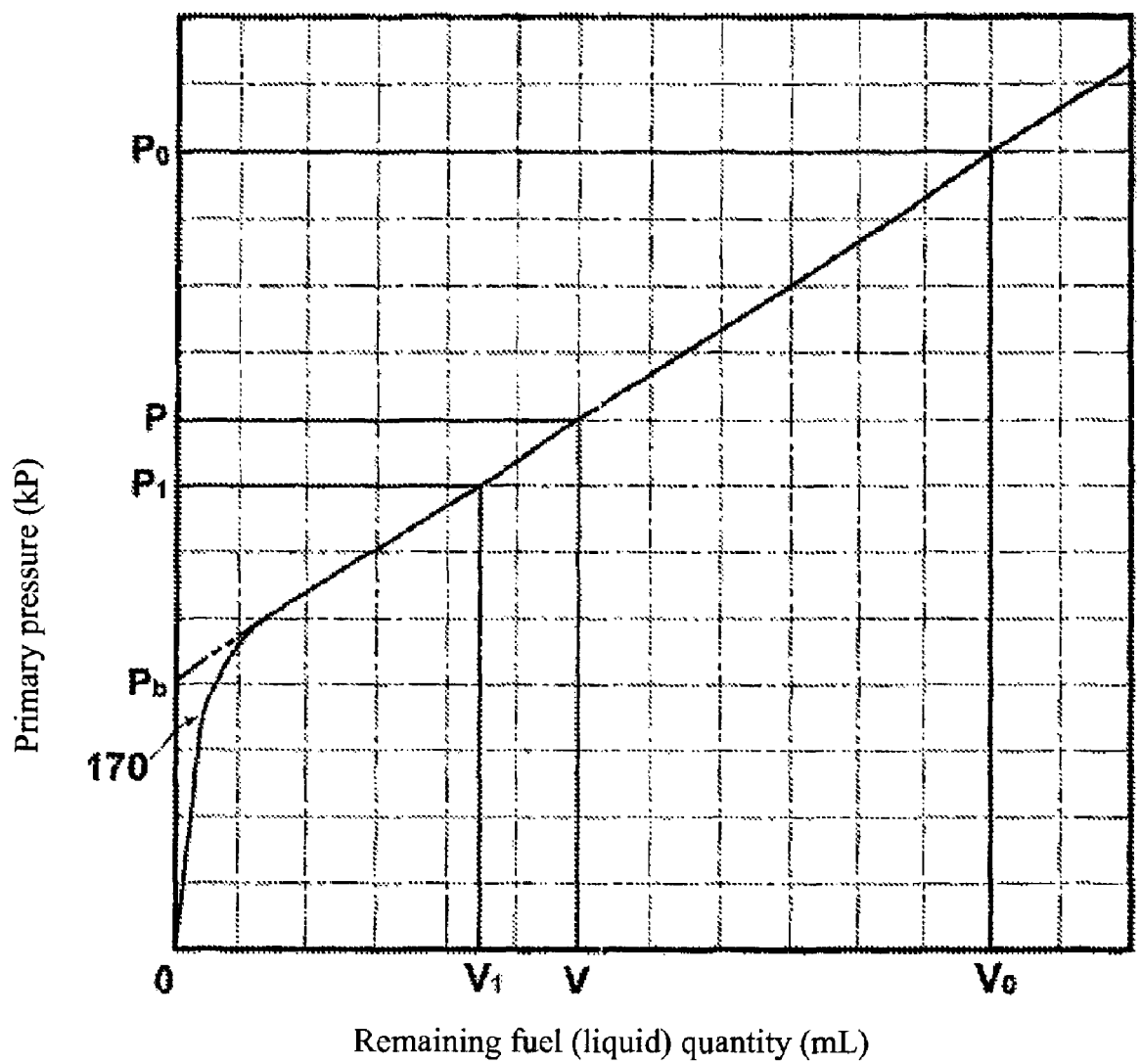
FIG. 3 is a graph showing the mutual relationship between the residual fuel quantity inside the fuel cartridge and the primary pressure.

Next, the manner in which the primary pressure detected by the pressure detector 50 is converted to the residual fuel quantity will be described referring to FIG. 3. FIG. 3 is a graph showing the mutual relationship between the residual fuel quantity V inside the cartridge 100 and the primary pressure P. The computational expression of the residual fuel quantity V is derived from FIG. 3 as follows.

With the residual fuel quantity V on the horizontal axis and the primary pressure P on the vertical axis, primary pressure $P_0$ of an arbitrary residual quantity $V_0$ is measured. Next, primary pressure $P_1$ of residual quantity $V_1$ less than residual quantity $V_0$ is measured. A graph showing the mutual relationship is obtained from this. This graph is a straight line, namely, a linear function that has a specified slope. An accurate slope of the graph is obtained as the difference of residual quantity $V_0$ and $V_1$ grows larger. Although this is the case, an accurate value is not obtained when residual quantity $V_0$ is 0, namely, when there is no residual fuel quantity at all. Because of this, this case must be avoided. In other words, as residual quantity $V_0$ approaches 0, the primary pressure P suddenly falls, as shown by arrow 170, from the straight line indicating the specified slope and when V=0, P=0. In addition, when residual quantity V approaches 0, the primary pressure P suddenly moves toward 0. Therefore, if the moment when the primary pressure P becomes less than or equal to $P_b$ is monitored, the residual quantity V becoming 0 will be known in advance.

The graph that shows this mutual relationship can be approximated by the equation $P=\{(P_0-P_1)/(V_0-V_1)\}\times V+P_b$. If this equation is converted to an equation that finds the residual quantity V, the residual quantity V is obtained by the following equation 1 (V(ml) is the residual fuel quantity, P(kPa) is the primary pressure when monitored, $P_b$ is a constant, $V_0$ (ml) is an arbitrary residual quantity, $P_0$ (kPa) is the primary pressure of residual quantity $V_0$, $V_1$ (ml) is a residual quantity less than $V_0$, and $P_1$ (kPa) is the primary pressure of residual quantity $V_1$). Since values except for the residual quantity V and the primary pressure P when monitored (when measured) are already found, V can be obtained if P is measured. These operations are executed by the electrical converter 52.

$$V = \frac{P - P_b}{P_0 - P_1} \times (V_0 - V_1) \quad \text{EQUATION 1}$$

In the embodiment above, although the mutual relationship between the residual quantity V and the primary pressure P could be approximated by a linear function, other mutual relationships (for example, second order curves and logarithms or exponents) can also be detected in the same manner by applying an approximation equation. Furthermore, even if an approximation equation is not found, the residual quantity when monitored can be detected by means of storing the relationship between the residual quantity and the primary pressure.

If the ambient temperature $T_0$ when measuring parameters other than the residual quantity V and the primary pressure P ($P_0$, $V_0$, $P_1$, $V_1$, $P_b$) and the ambient temperature T when monitored are different, errors will occur in the primary pressure P that was detected. Because of this, the obtained value of the residual quantity V will contain errors. Therefore, an even more accurate residual fuel quantity V' can be calculated by means of compensating for the residual quantity V using the following equation as shown below.

Correcting the detected pressure P to $P_h$ (kP) will be described. If the ambient temperature when measuring the parameters $P_0$, $V_0$, $P_1$, $V_1$, $P_b$ is $T_O$ (Kelvin) and the temperature when measuring P (kP) is T (Kelvin), the relationship $P_h/P = T/T_0$ will form and from this the corrected primary pressure $P_h = (T/T_o) \times P$ is obtained. If this $P_h$ is applied to P of the equation that finds the residual quantity V above, the corrected residual fuel quantity V' is obtained.

In other words, the corrected residual fuel quantity V' is obtained by the following equation 2 (V' (ml) is the corrected residual fuel quantity, $T_0$ (Kelvin) is the ambient temperature when measuring $P_0$, $V_0$, $P_1$, $V_1$, $P_b$, and T (Kelvin) is the ambient temperature when detecting P).

$$V' = \frac{(T \times P - T_0 \times P_b) \times (V_0 - V_1)}{T_0 \times (P_0 - P_1)} \quad \text{EQUATION 2}$$

If an accurate value of the residual fuel quantity is measured in this manner, the required quantity of fuel 119 to be filled is easily calculated by an operation that subtracts the residual fuel quantity from the fully filled quantity.

Next, a detailed embodiment will be presented.

Embodiment 1

When there is No Temperature Correction

When the parameters were $V_0$=6 mL, $P_0$=350 kPa, $V_1$=1 mL, $P_1$=169 kPa, $P_b$=133 kPa, and $T_0$=293.15 K, the monitored pressure P was P=205 kPa. The residual fuel quantity V at that time was found by applying equation 1 mentioned above and then using the following equation.

$$V = \frac{P - P_b}{P_0 - P_1}(V_0 - V_1) = \frac{205 - 133}{350 - 169} \times (6 - 1) = 1.99 \text{ mL} \quad \text{EQUATION}$$

Embodiment 2

When there is Temperature Correction

When the monitored pressure P was P=205 kPa and the ambient temperature T when monitored was T=313.15 kPa, the corrected residual fuel quantity V' was found by applying equation 2 mentioned above and then using the following equation.

$$V' = \frac{TP - T_0 P_b}{T_0 \times (P_0 - P_1)}(V_0 - V_1) \quad \text{EQUATION}$$
$$= \frac{313.15 \times 205 - 293.15 \times 133}{293.15 \times (350 - 169)} \times (6 - 1)$$
$$= 2.38 \text{ mL}$$

Although a method to detect the residual quantity of liquid from the primary side pressure was described above, in the following a method to detect the residual quantity of liquid from the secondary side pressure of the regulator 2 will be described. This method utilizes the fact that the regulator output (secondary side pressure) is mutually related to the primary pressure. Although this is the case, the primary pressure increasing on the valve element (O-ring 34) results in the secondary side pressure generating errors. Because of this, taking these errors into consideration and measuring the secondary side pressure makes it possible to estimate the primary pressure with comparative accuracy and then find the residual quantity of liquid based on this primary pressure.

Figure 4:
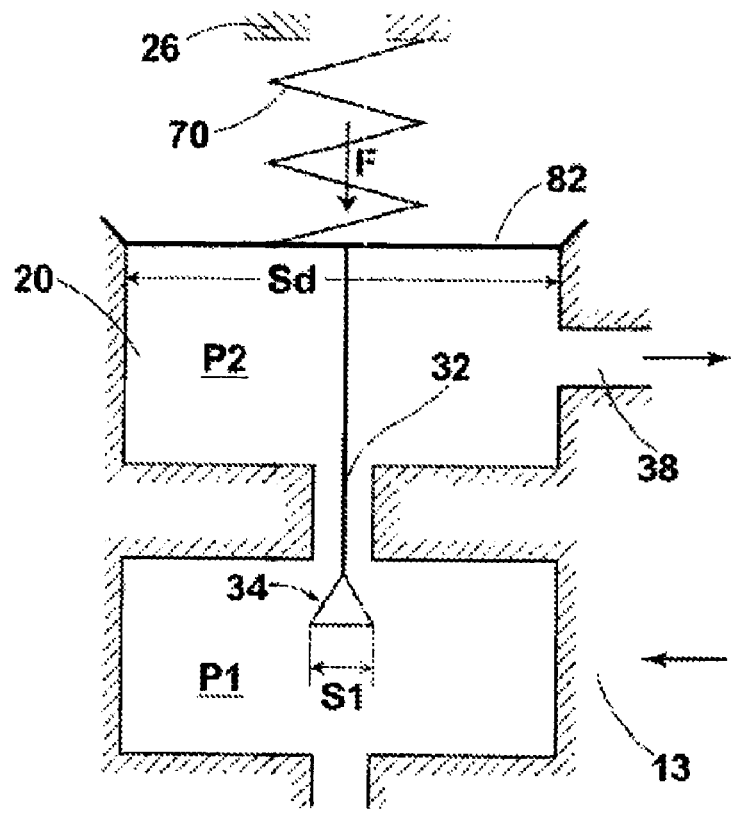
FIG. 4 is a compositional diagram that describes the pressure regulation function of the regulator of FIG. 1.
Figure 5:
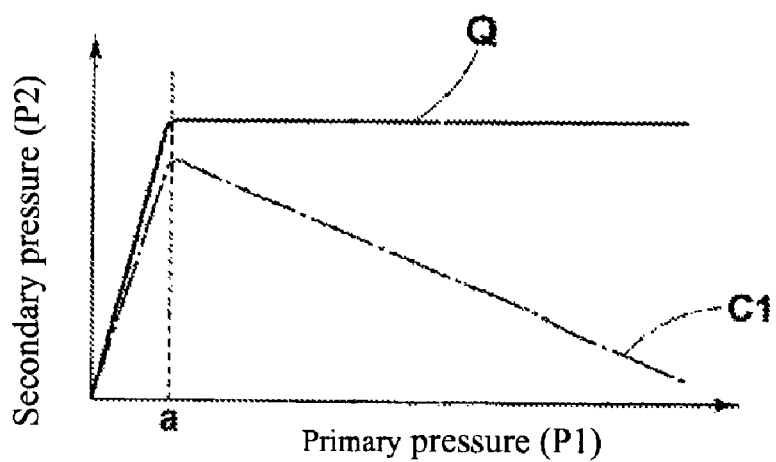
FIG. 5 is a characteristic diagram of the regulator showing pressure regulation characteristics of the secondary pressure compared to the primary pressure.

At first, the pressure regulation characteristics of the secondary pressure accompanied by fluctuations in the primary pressure, namely the relationship between the primary pressure and the secondary pressure, will be described referring to FIG. 4 and FIG. 5. FIG. 4 is a compositional diagram that describes the pressure regulation function of the regulator 2. FIG. 5 is a characteristic diagram of the regulator 2 showing pressure regulation characteristics of the secondary pressure compared to the primary pressure. This characteristic diagram of FIG. 5 takes into consideration pressurization errors of the O-ring 34 which is the primary regulating valve for gradual drops in the primary pressure inside this cartridge 100 when supplying the fuel 119 from the cartridge 100.

In FIG. 4 the equilibrium of the diaphragm 82 is F+ΔZ*K=P2*Sd when the pressure regulation characteristics according to the O-ring 34 when pressurization errors are not considered are the primary pressure represented by P1, the secondary pressure represented by P2 (differential pressure between atmospheric pressure), the effective surface area of the diaphragm 82 represented by Sd, this displacement magnitude represented by ΔZ, the set load of the compression coil spring 70 represented by F, and the spring constant represented by K. Then from this, the secondary pressure P2 is P2=(F/Sd)+(ΔZ*K/Sd) and the diaphragm 82 moves until ΔZ=(P2*Sd/K)−(F/K) and stabilizes at the secondary pressure of P2=(F/Sd)+(ΔZ*K/Sd) mentioned above.

In other words, when the primary pressure P1 is P1≧(F/Sd)+(ΔZ*K/Sd), the secondary pressure P2 will be uniform without any relationship to this primary pressure change. The ideal pressure regulation characteristics correspond to the solid line Q in FIG. 5. Point a in FIG. 5 is P1=(F/Sd)+(ΔZ*K/Sd) and the secondary pressure P2 in the region of the primary pressure P1 higher than this is uniform.

Next, if we consider a pressure loss for the pressurization errors of the O-ring 34, namely the primary pressure P1 that acts in the direction where the sealed shaft 32 recedes, the equilibrium of the diaphragm 82 is $F+\Delta Z*K=P2*Sd+P1*S1$ (the projected surface area of the O-ring $34=S1$) and then from this, the secondary pressure P2 is $P2=(F/Sd)+(\Delta Z*K/Sd)-(P1*S1/Sd)$. These pressure regulation characteristics are characteristics similar to the broken line C1 of FIG. 5 and are shifted from ideal characteristic Q by ($P1*S1/Sd$) only. Because of this, they are characteristics of which the secondary pressure P2 drops while the primary pressure P1 rises as shown by C1 in FIG. 5. The degree of this straight line slope is obtained by actual measurements of the primary pressure P1 and the secondary pressure P2.

Next, an embodiment when detecting the residual quantity of fuel from the secondary pressure will be described.

Embodiment 3

When Detecting the Residual Quantity of Fuel from the Secondary Pressure (When there is No Temperature Correction)

At first, the relationship between the primary pressure P1 and the secondary pressure P2 was measured. The cartridge used here could hold 25 mL of liquid fuel. This cartridge had a pressure $P_0$ of 300 kPa when $T_0=293.15$ K, $V_0=25$ mL and a primary pressure $P_1$ of 180 kPa when $V_1=10$ mL. The relationship between the primary pressure P1 and the secondary pressure P2 at this time is the relationship shown in FIG. 7.

Figure 7:
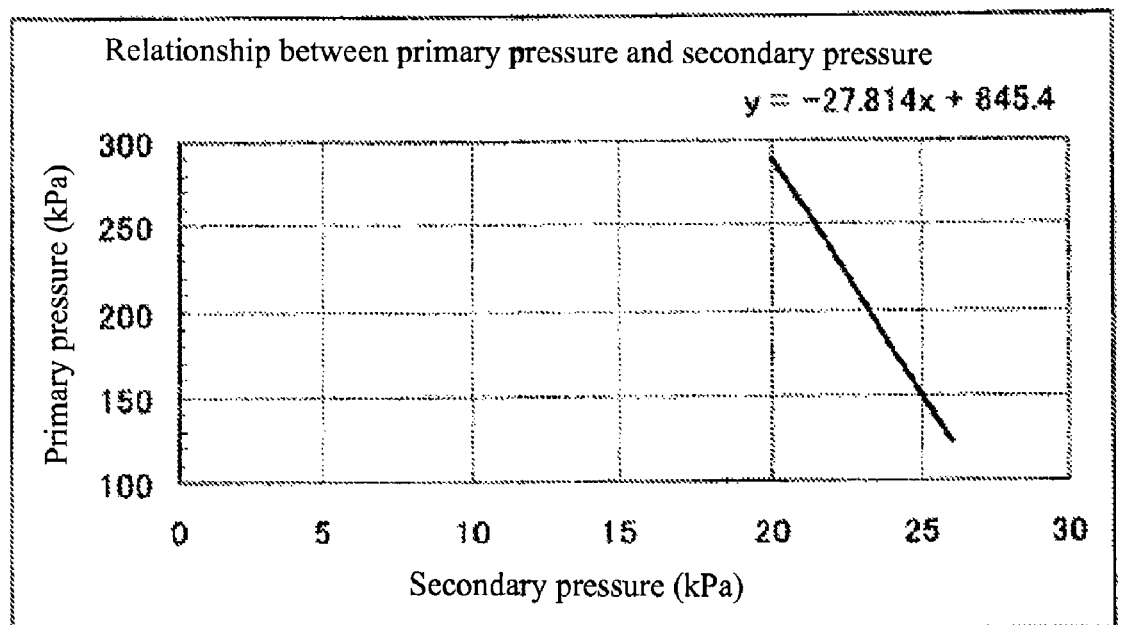
FIG. 7 is a graph showing the relationship between the primary pressure and the secondary pressure when detecting the residual quantity of fuel from the secondary pressure.

The primary pressure is found from FIG. 7 by measuring the secondary pressure using the equation shown below.

Primary pressure=−27.814×secondary pressure+845.4 (equation 3)

$P_b=100$ kPa at this time. The monitored secondary pressure was 24 kPa. Therefore, if the primary pressure P is $P=-27.814\times24+845.4=177.864$ kPa using equation 3 above and calculations executed using equation 1 in the same manner as embodiment 1, the residual quantity of fuel V is found using the equation shown below.

$$V = \frac{177.864 - 100}{300 - 180} \times (25 - 10) = 9.73 \text{ mL} \quad \text{EQUATION}$$

Embodiment 4

When Detecting the Residual Quantity of Fuel from the Secondary Pressure (When there is Temperature Correction)

When the ambient temperature T was $T=313.15$ K in a cartridge identical to embodiment 3, the monitored secondary pressure was 22 kPa. If we use equation 3 in the same manner as embodiment 3 to find the primary pressure P, $P=-27.814\times23+845.4=205.678$ kPa and then if this is calculated by applying equation 2 in the same manner as embodiment 2, the corrected residual quantity of fuel V is found using the equation shown below.

$$V' = \frac{313.15 \times 205.678 - 293.15 \times 100}{293.15 \times (300 - 180)} \times (25 - 10) \quad \text{EQUATION}$$
$$= 14.96 \text{ mL}$$

Embodiment 5

When Detecting the Residual Quantity of Fuel from the Secondary Pressure

Figure 8:
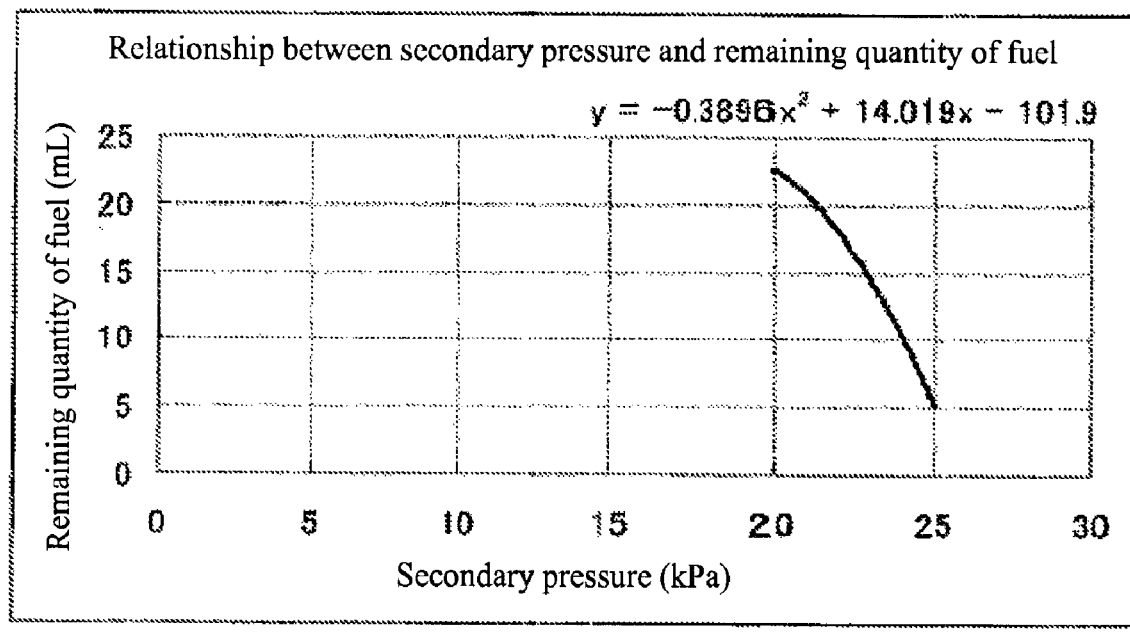
FIG. 8 is a graph showing the relationship between the secondary pressure and the residual quantity of fuel when detecting the residual quantity of fuel from the secondary pressure.

We used a cartridge with a capacity of 25 mL and measured the relationship between the secondary pressure and the residual quantity of fuel in advance. This relationship was the graph of curves as shown in FIG. 8.

From this graph, the relationship between the residual quantity of fuel V and the secondary pressure is as shown by the equation below.

$V=-0.3896\times$(secondary pressure)$^2+14.019\times$secondary pressure$-101.9$ (equation 4)

The residual quantity of fuel can be understood from the secondary pressure by means of using this equation 4. For example, the residual quantity of fuel V when the monitored value of the secondary pressure is 23 kPa is as shown by the equation below.

$V=-0.3896\times23^2+14.019\times23-101.9=14.49$ mL

Next, filling the cartridge 100 shown in FIG. 1 with fuel 119 will be described referring to FIG. 6. FIG. 6 is a cross section of the cartridge 100 showing when an adapter is mounted. In FIG. 6, the adapter 200 is mounted to the cartridge 100 instead of the regulator 2. This adapter 200 is used when filling an empty cartridge 100 or a cartridge 100 with a small residual quantity of fuel with the fuel 119. The adapter 200 has almost the same composition as the introduction convex member 3 of the regulator 2. Furthermore, the adapter 200 has a cylindrical-shaped main body 202, a wall 204 formed inside this main body 202, an introduction opening 202a, a column-shaped protrusion 206 suspended from the center of the wall 204 inside the introduction opening 202a, and a detection nozzle 208 that passes through to the introduction opening 202a. Nothing is formed on the adapter 200 equivalent to the transparent hole 16 of the regulator 2.

When the adapter 200 is mounted to the connection member 102, the column-shaped protrusion 206 presses against the sealed shaft 126, the fuel 119 of the primary pressure passes through the introduction opening 202a from the fuel storage chamber 118, and is then discharged from the detection nozzle 208, 208a. Next, the pressure of the discharged fuel 119 is measured and the required filling quantity calculated. Thereafter, the adapter 200 is removed, the connection member 102 is connected to a fuel filling device (not shown in the figure), and the fuel 119 is filled from the through hole 126 of the connection member 102.

As another mode of the adapter 200 (not shown in the figure), a composition is considered in which a transparent hole, similar to the transparent hole 16, and a valve that opens and closes this hole are provided on the wall 204. When the adapter of this mode detects the primary pressure, after the valve closes the hole and the residual quantity can be confirmed, the fuel 119 can be supplied from the hole to the fuel storage chamber 118 of the cartridge 100 with the valve open and the adapter 200 attached to the connection member 102.

The invention claimed is:

1. A residual liquid quantity detecting method for detecting a residual quantity of liquid in a liquid supply device, which comprises:
connecting a regulator to the liquid supply device, the liquid from the liquid supply device being supplied to the regulator by a primary supply pressure, the regulator reducing the pressure of the liquid to a secondary supply pressure to supply the liquid of the secondary supply pressure to the outside of the liquid supply device, detecting the secondary supply pressure, and calculating the residual quantity of liquid in the liquid supply device.

2. The residual liquid quantity detecting method of claim 1, wherein the secondary supply pressure is measured by a pressure detector and the residual quantity of liquid is computed by an electrical converter.

3. The residual liquid quantity detecting method of claim 1, which further comprises displaying the residual quantity of liquid in a display unit.

4. The residual liquid quantity detecting method of claim 1, which further comprises correcting the residual quantity of liquid based on an ambient temperature of the liquid supply device.

5. A residual liquid quantity detecting method for detecting a residual quantity of liquid in a liquid supply device, which comprises:

allowing the liquid to be supplied from the liquid supply device to the outside of the liquid supply device by a primary supply pressure, detecting the primary supply pressure of the liquid, and measuring the residual quantity of liquid by the following equation, $$V = \frac{P - P_b}{P_0 - P_1} \times (V_0 - V_1)$$

wherein V is the residual quantity of liquid, P is the primary pressure while being monitored, $P_b$ is a fixed number, $V_0$ is an arbitrary residual quantity of liquid, $P_0$ is the primary pressure of the residual quantity of liquid $V_0$, $V_1$ is a residual quantity of liquid smaller than $V_0$, and $P_1$ is the primary pressure of the residual quantity of liquid $V_1$.

6. The residual liquid quantity detecting method of claim 5, wherein the primary supply pressure is measured by a pressure detector and the residual quantity of liquid is computed by an electrical converter.

7. The residual liquid quantity detecting method of claim 5, which further comprises displaying the residual quantity of liquid in a display unit.

8. The residual liquid quantity detecting method of claim 5, which further comprises correcting the residual quantity of liquid based on an ambient temperature of the liquid supply device.

9. The residual liquid quantity detecting method of claim 8, wherein the residual quantity of liquid is corrected by the following equation, $$V' = \frac{(T \times P - T_0 \times P_b) \times (V_0 - V_1)}{T_0 \times (P_0 - P_1)}$$

wherein V' is the corrected residual quantity of liquid, $T_0$ is the ambient temperature when measuring $P_0$, $V_0$, $P_1$, $V_1$, $P_b$, and T is the ambient temperature when detecting P.

* * * * *